(12) United States Patent
van Zijverden et al.

(10) Patent No.: US 6,360,860 B1
(45) Date of Patent: Mar. 26, 2002

(54) CURRENT COLLECTOR

(75) Inventors: Corstiaan Jacob van Zijverden, Lopik; Andre Pieter Willem van Zaalen, Hooglanderveen, both of (NL)

(73) Assignee: Woodhead Industries, Inc., Deerfield, IL (US)

( * ) Notice: Subject to any disclaimer, the term of this patent is extended or adjusted under 35 U.S.C. 154(b) by 0 days.

(21) Appl. No.: 09/293,607

(22) Filed: Apr. 16, 1999

(30) Foreign Application Priority Data

Apr. 17, 1998 (NL) .............................................. 1008915

(51) Int. Cl.⁷ .................................................. B60L 5/00
(52) U.S. Cl. .................... 191/45 A; 191/45 R; 105/148
(58) Field of Search .............................. 104/89, 93, 94, 104/95, 106, 139, 140; 105/148, 150, 154, 155; 191/45 R, 47, 50, 52, 53, 56, 57, 58, 63, 63.1, 63.2, 63.3, 63.4, 63.5, 45 A

(56) References Cited

U.S. PATENT DOCUMENTS 2,007,893 A * 7/1935 Frank et al. ............... 191/45 R
2,018,016 A * 10/1935 Frank et al. ................. 105/148
2,537,866 A * 1/1951 Tanner ........................ 105/148
3,392,244 A * 7/1968 Hillmann ..................... 105/148
5,051,546 A * 9/1991 Bormann et al. ............. 104/89

* cited by examiner

*Primary Examiner*—Mark T. Le
(74) *Attorney, Agent, or Firm*—Thomas E. Hill

(57) ABSTRACT

A current collector is used with an elongated, generally closed rail having a slot extending the length thereof and plural power conducting strips disposed within and extending the length of the rail, with the current collector providing power to a mobile machine. The current collector includes a wagon disposed within the rail and having plural sliding contact brushes each engaging a respective power conducting strip within the rail. An electrical connector and cable leads are connected to the wagon for coupling the sliding contact brushes to the mobile machine for powering the mobile machine. The wagon moves on first and second wheel assemblies which are detachably connected to respective forward and aft portions of the wagon and which travel over inner portions of the closed rail.

19 Claims, 8 Drawing Sheets

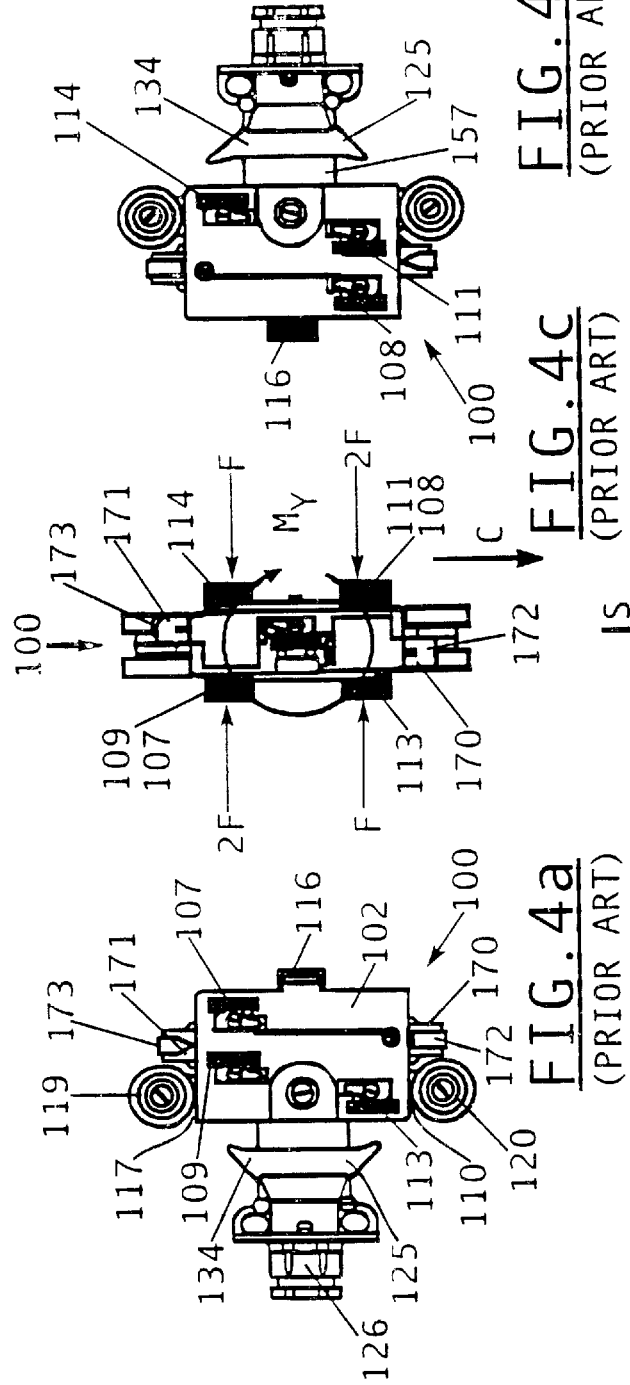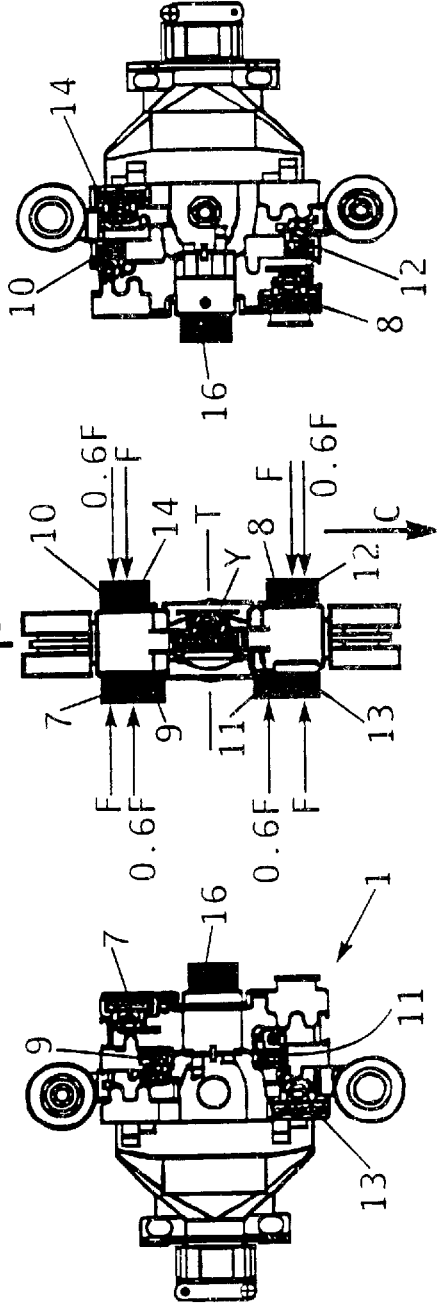
FIG. 4a (PRIOR ART)
FIG. 4b (PRIOR ART)
FIG. 4c (PRIOR ART)
FIG. 4d
FIG. 4e
FIG. 4f

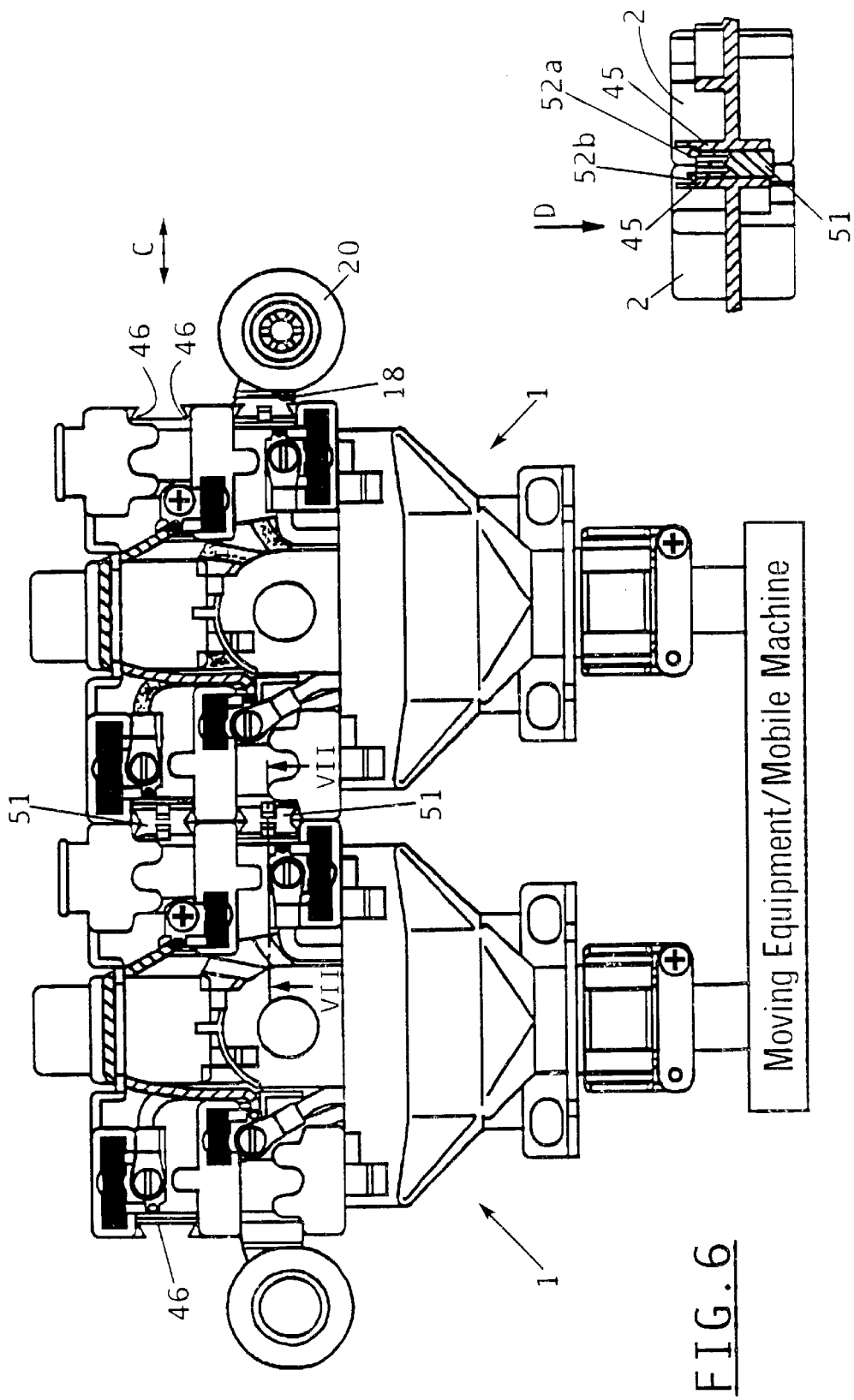

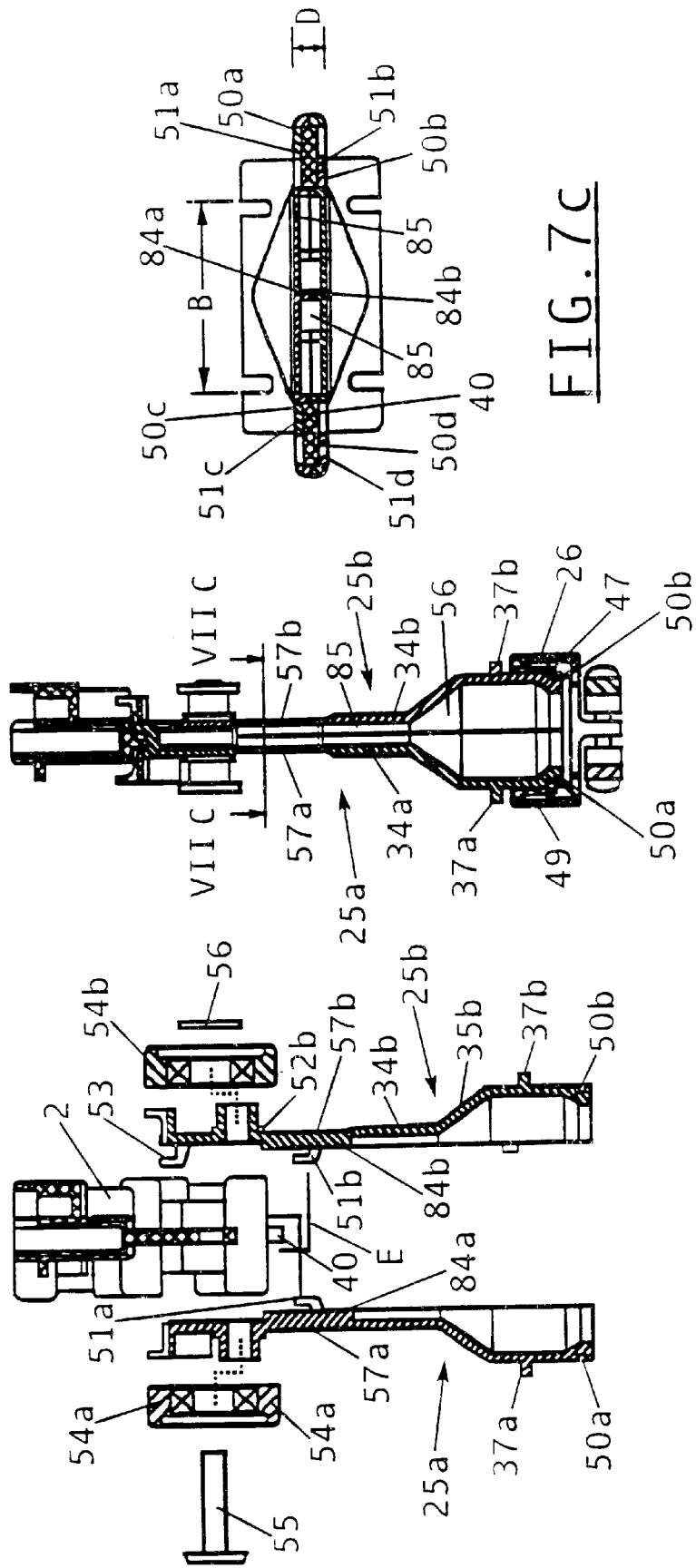

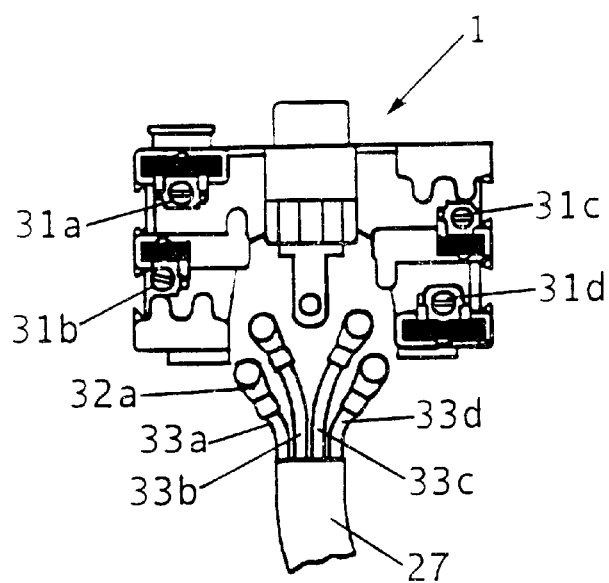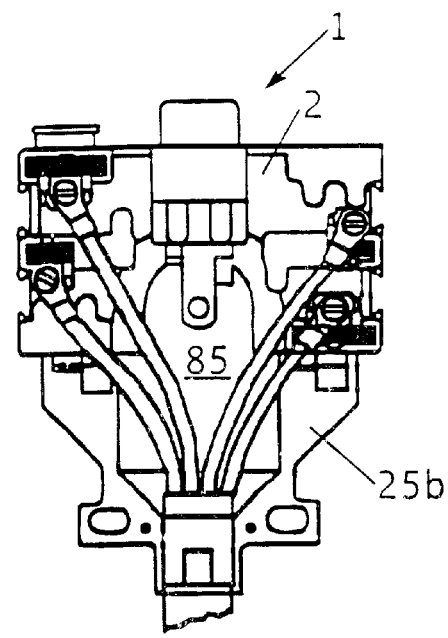
FIG.8a
FIG.8b
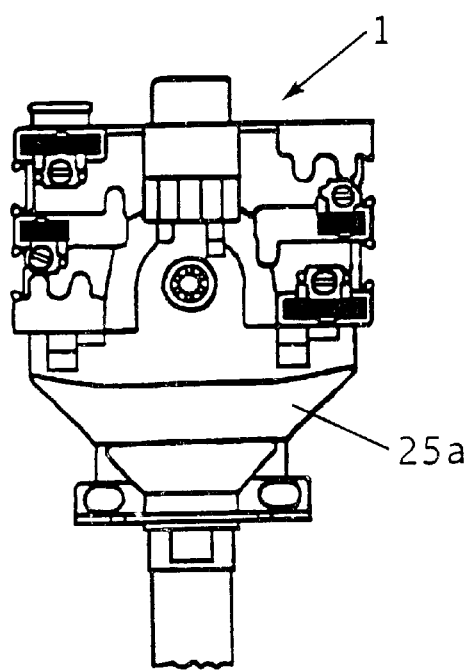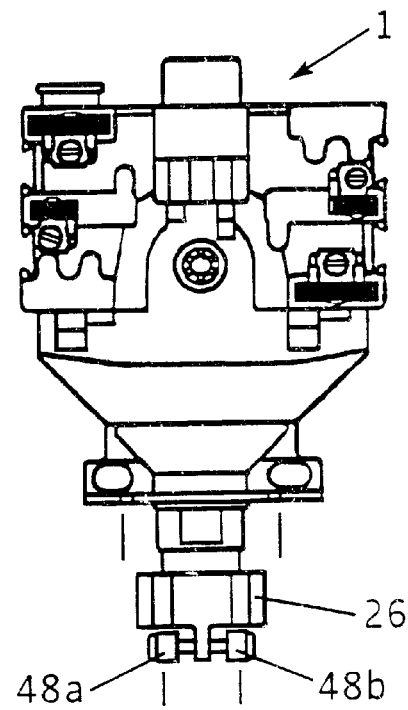
FIG.8c
FIG.8d

CURRENT COLLECTOR

BACKGROUND OF THE INVENTION

The invention relates to a collector for moving equipment, such as overhead cranes, electric hoists, etc. Such collectors are incorporated as a wagon supported by sliding supports or wheels in a U-profile rail which is mounted upside down and contains extruded conductor holders. The rail profile contains a number of conductors. A power cable connects the wagon(s) to a connection box which moves along with the moving equipment. A connecting chain pulls the wagon along with the equipment.

The wagon has carbon brushes mounted in the sides to pick-up the conductors' tension. The carbon brushes move in the rail's pick-up chambers. Configurations of four/six or five/seven conductors are possible; whereby the wagon has two or three carbon brushes, respectively projecting from both sides. In the latter two cases, an additional carbon brush projects up to contact a conductor in the top of the rail profile.

For stability reasons, the carbon brushes are mounted in pairs at the same level. Due to the carbon brush's length with respect to the wagon's width (also determined by the profile) this is only possible by sequentially placing the carbon brushes in the transport direction. To this end, the wagon (whose dimensions are kept to a minimum) contains a pick-up chamber orientated to the one side at the front part and a pick-up chamber orientated to the other side at the back part. This type of wagon has been in use for many years.

However, the stability of these wagons is not optimum. The wagon moves slightly around the central axis due to the asymmetric positioning of the carbon brushes with respect to the central axis. This is, especially, the case when three carbon brushes are mounted on either side of the wagon. As a result, the parts of the wagon projecting from the bottom of the rail, the so-called bow, fastened to the bottom of the power cable (containing the conductors to the cable connectors near the carbon brushes) rub against the inner ridges of the profile's extruded conductor holders, eventually leading to failure. Another consequence of the wagon's off-centered position is that the carbon brushes wear unevenly, significantly reducing their life span. To prevent this, additional small (because of the limited space) horizontal side wheels are occasionally placed on the wagon. However, these small wheels often cannot handle the high number of revolutions. In addition, they require additional assembly labor and material.

SUMMARY OF THE INVENTION

The invention is aimed at improving this in an efficient way. To this end, the invention consists of a collector for moving equipment (such as overhead cranes), with a wagon equipped with means for picking up power using sliding contacts over a number of fixed conductors in a rail profile. The contact means transfer power from a number of cable connectors in the wagon with electric wires from a power cable connected for the installation's power supply. The wagon contains at least two sequentially sub-contact means on either side of the vertical axis on one side of the wagon.

This stabilizes the wagon at least in one tilt direction because two stabilization points are mounted at the same level on one side of the wagon. In addition, the contact with the conductors is more reliable because, should one (sub-) contact means on one side of the wagon fail to make contact, the other one will make contact. This is very important for the data line's power contacts.

In the preferred configuration, for the two conductors at the same level on either side of the wagon, at least two sub-contact means are fitted sequentially to the wagon on either side of the vertical central axis. The presence of two (sub-) contact means at one level on either side of the wagon prevents the wagon from tilting around an axis with a vertical component.

In the preferred configuration, the sub-contact means on both sides of the wagon are located symmetrically with respect to a vertical plane which is at right angles to the transport direction and further increases stability.

The sub-contact means are preferably placed in the collector's pick-up chambers. These pick-up chambers can be used without further mechanical intervention in the wagon's composing parts and take-up as much room as the normal carbon brush's pick-up chamber.

An additional chamber is created for extra, vertical guide wheels (when required) to increase the wagon's stability in the vertical plane by omitting the side wheels.

The contact means are generally formed as carbon brushes and the sub-contact means each form an equal part.

Preferably three conductors are mounted on each side. The shared contact means (from a vertical point of view) are situated between the other two contact means. As a rule, the data line goes through the middle conductor(s) to ensure good contact.

To increase stability and the contact's reliability, it is recommended that at least one of the other contact means is shared at another level.

The conductors' wagons generally have a housing consisting of two halves; one placed against the other in a vertical plane and fixed using a bolt through the wagon. This bolt can be replaced by an additional axis. The power cable passes through the housing's bow parts. The bow parts have a screw thread at the bottom to fix a tension relief collar for the power cable.

When the bow is about to wear through, as a result of the intensive contact with the rail profile's ridges containing the conductors, the entire housing must be replaced resulting in relatively high costs. Another disadvantage is apparent when trying to connect the power cable to the wagon in situ. The entire housing must be opened up to correctly manipulate the electric wires.

This invention is aimed at improving this situation. To this end, the invention consists of a collector for moving equipment (such as overhead cranes), with a wagon equipped with means for picking up power using sliding contacts over a number of fixed conductors in a rail profile.

The contact means transfer power from a number of cable connectors in the wagon with electric wires from a power cable connected for the installation's power supply. The wagon contains a housing with a bow on the underside, projecting out of the profile for the power cable's passage. The bow can be detached from the housing.

When the bow is worn-out, it can be easily replaced. To connect the power cable, the bow is moved to the end of the housing, the electric wires are fed into the housing from underneath and connected to the cable connectors. Finally, the bow is fixed to the housing.

In the preferred configuration, the bow has two bow parts; one placed against the other in a vertical plane. In doing so, the wagon's bow can be detached without releasing the power cable.

In the preferred configuration, the bow parts are held together by an axis through both bow parts. Support wheels can be mounted onto the axis, when required. The existing wagon has such an axis but in the new configuration, the axis serves an extra purpose, i.e. it keeps the bow parts together.

In the preferred configuration, two bow parts are also held together by the tension relief collar. The existing wagon has a gland nut screwed onto the bow. The tension relief collar, which is clicked into place, now serves an extra purpose, i.e. it keeps the bow parts together.

The bow is preferably flat and determines the area for the conductors from the power cable with an oblong cross-section in the horizontal plane, originating at the bow's front edge and ending at the bow's back edge. The bow's internal length in the transport direction is sufficient to place at least seven 6 mm$^2$ electric wires next to each other. With this number of electric wires, the bow can still be flat reducing the chances of wear as a result of friction on the U profile's ridges.

Generally, each carbon brush can pass a current intensity of maximum 35 A. Several wagons with carbon brushes on the same side and at the same level can be coupled to increase the current intensity. A current intensity of 70 A and 100 A is achievable with two or respectively, three wagons.

The wagons are coupled using a rectangular steel connecting plate underneath the wagons connecting the wagon's bows. To move the wagons closer together, the guide wheels are removed from both sides of one wagon.

Special parts are required to couple the wagons; for example, the connecting plate which must be tuned to two or three wagon lengths. The assembly requires quite some effort as does the disassembly when parts of the wagon (such as the housing) need to be replaced. In addition, the wheels between the wagons can damage the other wagon's housing (as a result of possible flexing with respect to the other wagon). As a result, the housing must be replaced frequently. The collectors can tilt because the wheel sets are loose on one side and because of the possible deviation in the alignment. The bow's friction against the rail results in wear and damage to the separate collectors.

The invention is aimed at improving this. To this end, the invention consists of a collector for moving equipment (such as overhead cranes), with a wagon equipped with means for picking up power using sliding contacts over a number of fixed conductors in a rail profile. The contact means transfer power from a number of cable connectors in the wagon with electric wires from a power cable connected for the installation's power supply. Wheels are fixed at the front and at the back of the wagon to guide it in the rail profile. The wagon and the wheels are respectively equipped with co-operating, detachable first and second click connectors. The collector is equipped with a coupling with second coupling means on opposite sides.

The wheels can be released easily and quickly from the wagon and replaced with the coupling part. The wagons are directly linked within the rail profile which increases the running stability. The wheels are also easily replaced with similar wheels, other types of wheels or wheel combinations.

The connector means are preferably dovetail-shaped and/or click connectors to provide simple and reliable assembly.

BRIEF DESCRIPTION OF THE DRAWINGS

The inventions discussed previously will be explained, based on a number of example configurations in the attached figures.

FIGS. 4A–4C, 4D–4F respectively show a front view and top view of the conventional collector, respectively a side view and top view of the collector based on the invention showing the forces involved;

FIG. 6 shows a side-view of collectors linked to each other using a click connector, based on the invention;

FIG. 7 shows a cross-section of a click connector according to arrow VI A;

FIGS. 7A–7C show respectively a cross-section of a construction diagram, a vertical and a horizontal cross-section of the bow parts in the collector (as in FIG. 1); and FIGS. 8A–8D show front views of the wagon (as in FIG. 1) during the different assembly stages of the bow parts.

DETAILED DESCRIPTION OF THE PREFERRED EMBODIMENTS

Figure 1:
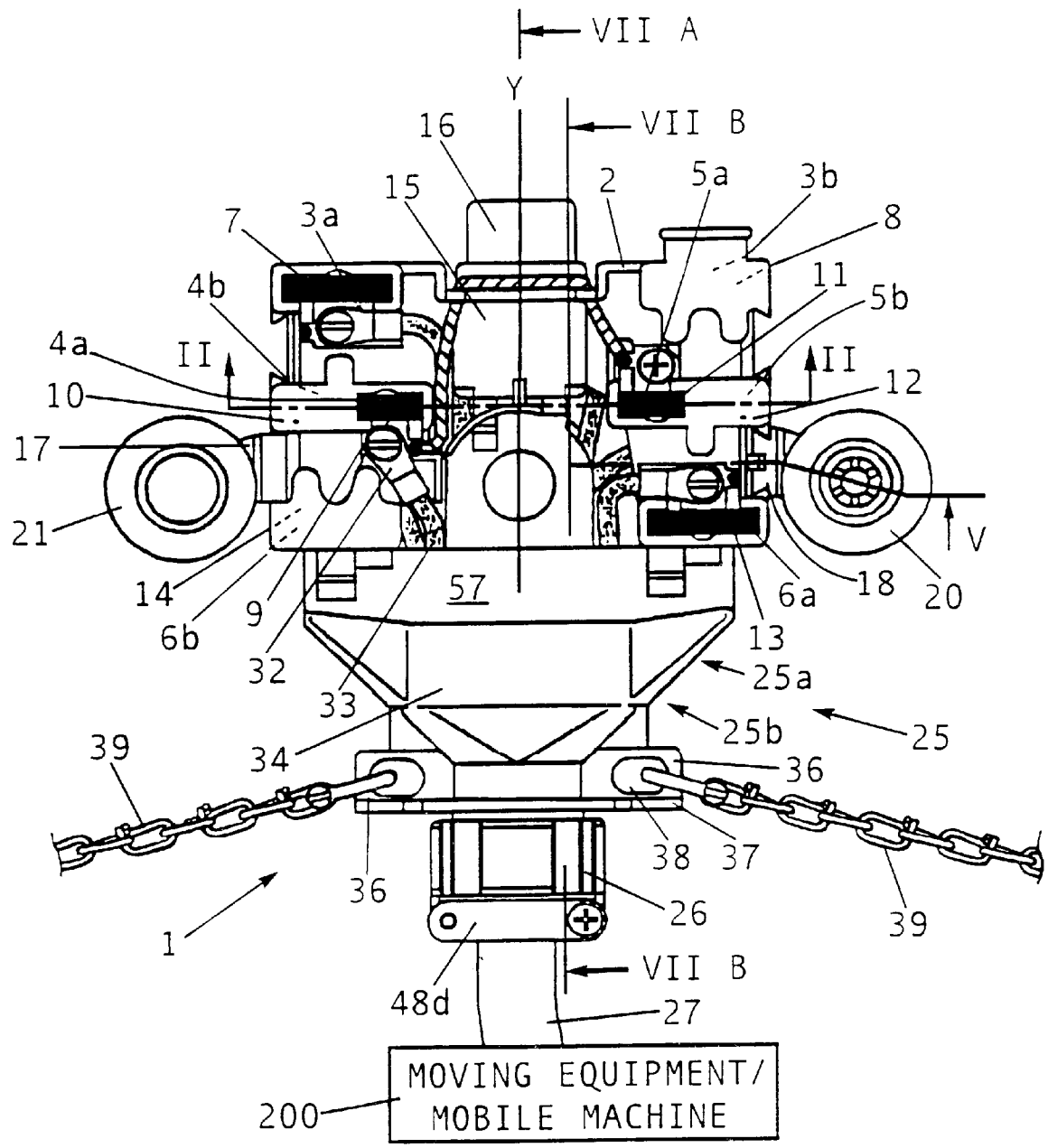
FIG. 1 shows the collector's vertical cross-section based on the invention.
Figure 2:
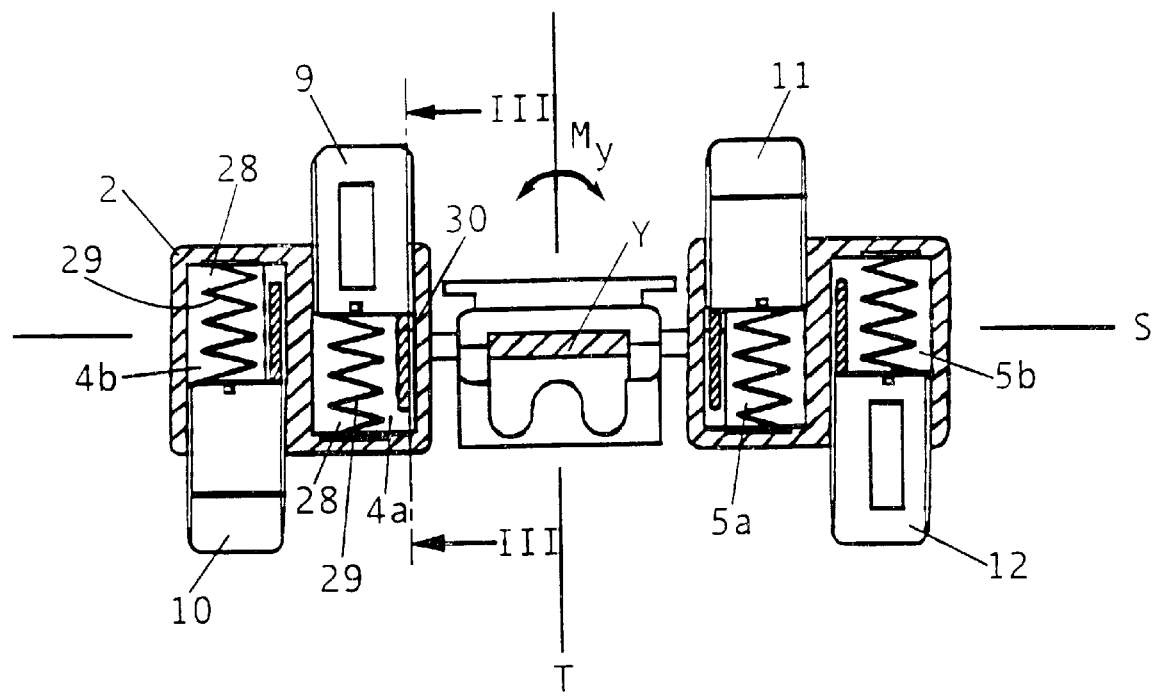
FIG. 2 shows a horizontal cross-section of the collector (as in FIG. 1), based on the arrows II.

The collector (1) as shown in FIG. 1 consists of a plastic housing (2) with pick-up chambers (3a, 3b, 4a, 4b, 5a, 5b, 6a, 6b) on both long sides. The pick-up chambers open to the side. The housing has a long field of symmetry (S) in general (FIG. 2). The pick-up chambers (3a, 3b) are situated at the top level and are turned to opposite sides. Pick-up chambers (6a, 6b) are situated at the bottom level, also turned to opposite sides.

The middle level contains several pick-up chambers; if we take the right-hand side of FIG. 1 as the front of the wagon (1), two opposite pick-up chambers (4a, 4b) are situated at the back of the wagon (1). Two opposite pick-up chambers (5a, 5b) are situated at the front of the wagon. The pick-up chambers (4a, 4b, 5a and 5b) are approximately half the width of the pick-up chambers (3a, 3b, 6a and 6b). As shown in FIG. 2, the pick-up chambers (4a, 5a) are symmetrically situated with respect to the cross symmetry field (T) of wagon (1). The same applies to pick-up chambers (4b, 5b).

The pick-up chambers (3a, 3b, 4a, 4b, 5a, 5b, 6a and 6b) hold the carbon brushes (7, 8, 9, 10, 11, 12, 13, 14). The carbon brushes (9, 10, 11 and 12) are half the width of the carbon brushes (7, 8, 13 and 14).

Figure 3:
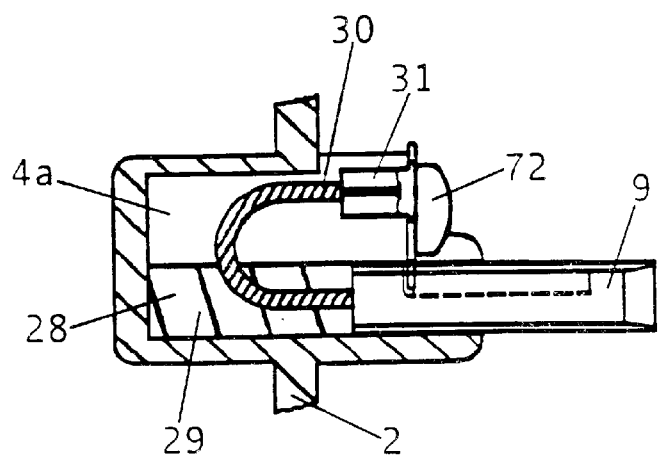
FIG. 3 shows a cross-section of the collector (as in FIGS. 1 and 2), based on the arrows III.

The pick-up chamber's vertical cross-section (4a) in FIG. 3 shows how the carbon brush (in this case carbon brush 9) is fixed in the pick-up chamber. The carbon brush (9) is connected to the cable connector (31) using electric wire (30). FIG. 1 shows how the cable connector (31) is fixed to the connecting shoe (32) of the electric wire (33). The electric wire (33) is one of the wires which are combined in the power cable (27) to supply power between the wagon (1) and the moving equipment/mobile machine 200, possibly through a connection box. In the connection box, the power cable is connected to the fixed cabling of the moving equipment, such as an overhead crane.

The pick-up chamber (4a) contains a hollow pin (28). The carbon brush (9) can be moved to and fro. The carbon brush (9) is pushed out under pressure using a pressure spring (29) in the cavity (28).

Figure 4:
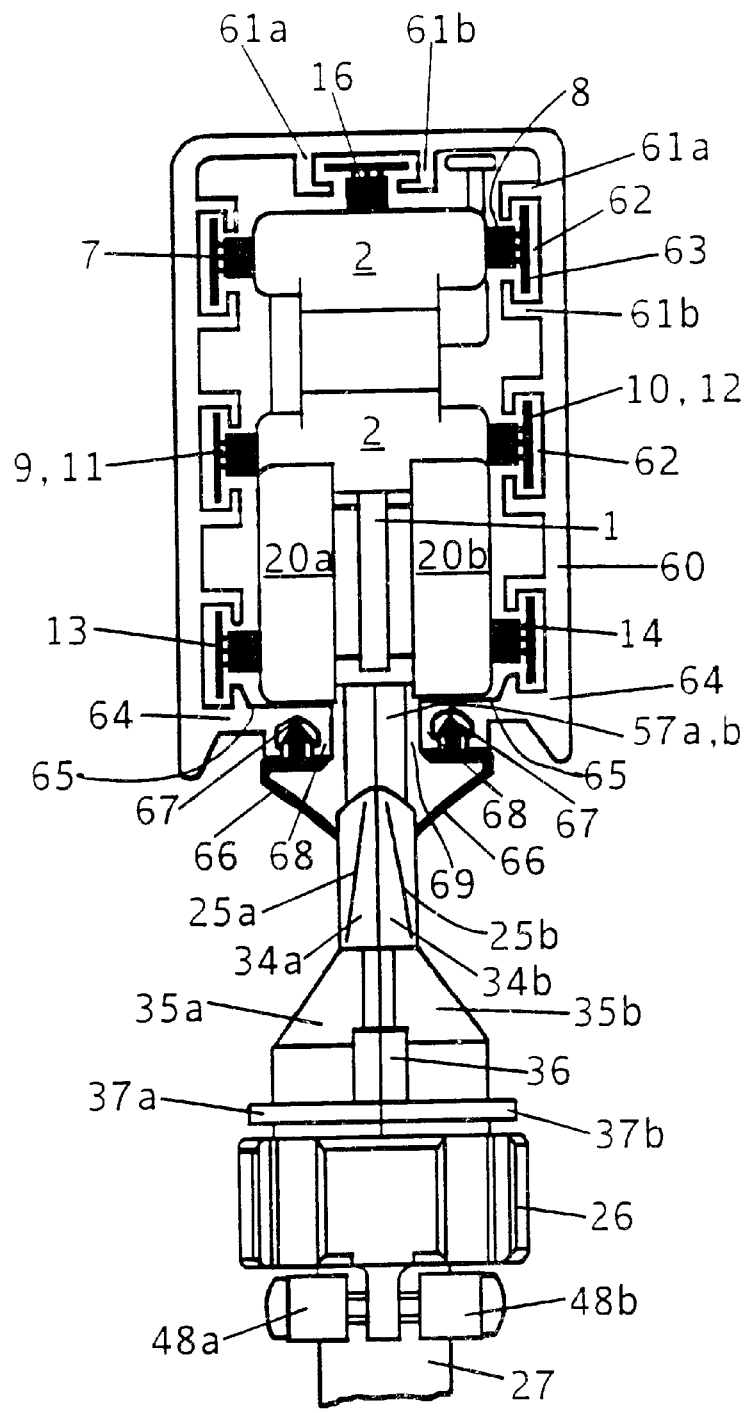
FIG. 4 shows a front view of the collector (as in FIGS. 1–3), with a rail profile with conductors.

FIG. 4 shows the collector (1) in the operating position in the plastic U shaped rail profile (60). Extruded slots (61a, 61b) on the inside of the rail are used to create pick-up chambers (62) for conductors (63). The U shaped profile (60) contains up to seven conductors. The conductors on the left-hand side press against carbon brushes (7, 9, 11 and 13), against the upper conductor's carbon brush (16) and against carbon brushes (8, 10, 12 and 14) on the right-hand side.

The U-profile (60) has extruded conductor holders for support flanges (64) with support areas (65) to support the wheels (20a, 20b). This enables the wagon (1) to be pulled along through the rails in a rolling manner using a chain (39). See FIG. 1.

Sealing strips (66) are fixed horizontally into the slots over the full length (67) on the support flanges' underside (64). These strips (66) seal the split (69) between the support flanges (64) during the bow's (25) passage against dust, etc. when the wagon is not present. The sealing strips (66) are flexible enough to move when the wagon's (1) bow (25) passes. The strips (66) have a sealing contact on the bow part's outer surface (34).

As is shown in FIG. 4, the following parts can be distinguished (from top to bottom) in the bow (25): item (34a, b) which is long and narrow (also refer to FIG. 1) and reaches through the split (69) with play. The bow (34) which easily pushes the strips (66) aside when moving in the transport direction and as can be seen in figure (1) transforms into part (57) above it; below it, the part (35) in FIG. 4 converges up. Here, the circular cross-section of the area for the power cable (27) is converted into the flat, mainly rectangular cross-section of part (34). Plates (36) with holes (38) for fixing the chain (39) have been fitted in the front and at the back of the part (35). As is shown in FIG. 7B, the underside of part (35) has a slot (50) for the spring loaded connection parts (49). Two clamping plates (48) have been fitted to the tension relief collar (26) to clamp the power's cable casing (27) and to relieve tension on it.

FIGS. 4A–4C show a side-view from the one side, a side-view from the opposite side and a top view of the conventional collector (100). The collector's (100) housing (102) consists of two halves, each with three pick-up chambers for carbon brushes (carbon brushes (107, 109, 113) and (108, 111, 114)). The housing's (102) halves also have wheel supports (117, 119). The wheels (119, 120) are fixed to the wheel supports (117, 119).

The housing's (102) parts are equipped with a bow part (127). This bow part contains a widened part (134) for the sealing strips of the profile. A gland nut (126) is fixed to the bottom of the bow (125).

When the collector (100) is part of a U-shaped rail profile with conductors (as indicated in FIG. 4), the carbon brushes press against the conductors under spring tension. As is shown in FIG. 4C, "C" is the direction of movement, a force of F respectively 2F is put at the front on both sides; a force of 2F respectively F is put at the back. As a result, a tilting moment My is exerted on the wagon which tilts in the rails causing wear to the bow. In addition, the carbon brushes can wear unevenly and adequate contact cannot always be guaranteed. To counteract the My moment, the conductor (100) has support brackets (170, 171) at the front and at the back with side wheels (172, 173).

Figure 5:
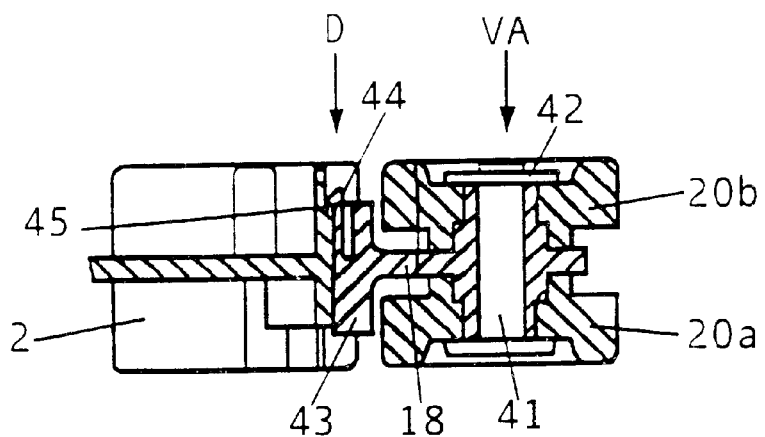
FIG. 5 shows a cross-section of one of the collector's wheels (as in FIG. 1), according to arrow V.

FIGS. 5–6A show another aspect of the collector based on the invention, namely the wagons can be coupled and easily equipped with the required wheels or other provisions. Dovetail-shaped coupling pin slots (46) are located at the front and back of the wagons at two levels. Coupling pins (51) can be slotted into these coupling pin slots (46), as shown in FIGS. 6 and 6A. The coupling pin (51) is made out of plastic and has two spring loaded connection parts (52a, 52b) which click behind the shoulders (45) in the bottom of the coupling pin slots (46). The coupling pin (51) has dovetail-shaped ridges (47) so they fit in the coupling pin slots (46) and a flexing motion in direction C is no longer possible (refer to FIG. 6). In this way, two or more collectors (1) can be coupled together to form one system.

Figure 5A:
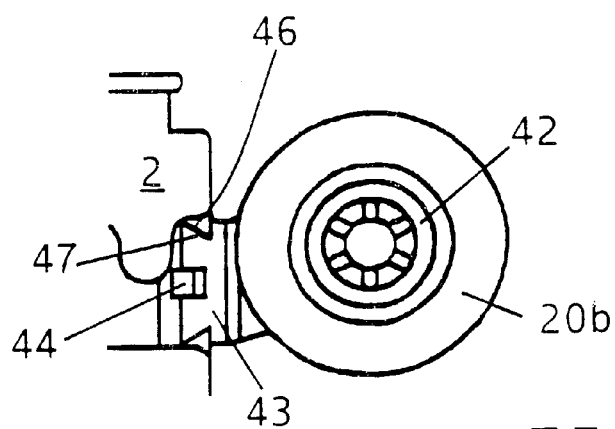
FIG. 5A shows a view of the wheel (as in FIG. 5), according to arrow V A.

The coupling pin slots (46) can also be used to fix one or more wheels, as shown in figures (5, 5A and 5B). FIGS. 5 and 5A show the assembly of one pair of guide wheels (20a, 20b), on the wheel support (18) using an axis (41) with a star lock washer (42) mounted onto it. The wheel support (18) has a dovetail-shaped part (43) which corresponds with the coupling's slot (51) and therefore has dovetail-shaped ridges (47) and a connection part (44) which clicks behind the shoulder (45). As can be observed, the connection part's end (44) can be reached from the direction D, with, for example, a screwdriver to neutralize the click-effect and to remove the wheel (or coupling (51)) as in FIG. 6A. In this way, the collector's (1) wheels can be removed easily and integrated into a coupled several collector configuration.

Figure 5B:
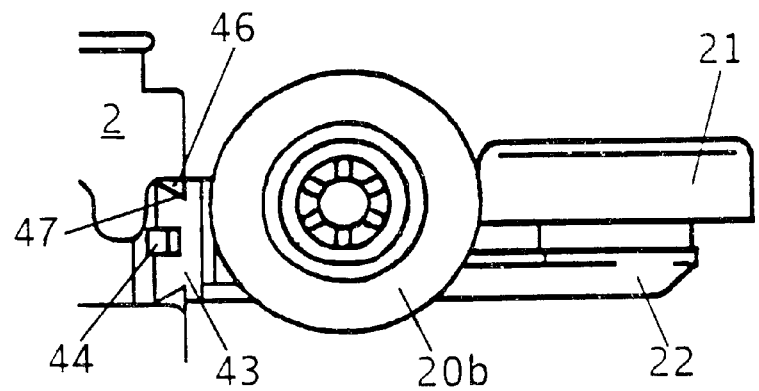
FIG. 5B shows an alternative for the wheel of FIG. 5A.

The wheels (20a, 20b) can also be replaced by the combined wheel set, as shown in FIG. 5B. An extension (22) with a horizontal guide wheel (21) fixed to the wheel support (18) is added to the wheel set as shown in FIG. 5A. The guide wheel (22) improves the wagon's alignment in the profile (60) due the wheel's relatively large distance from the central axis Y.

FIGS. 7A–7C show the bow's set-up and how it is mounted onto the wagon (1). Both bow parts (25a, 25b) are in the main the same, whereby the same parts have been given the same numbers, only distinguished by adding "a" or "b".

FIG. 7C shows the connecting hooks (51a, 51b, 51c, 51d) located near the front and back of the wagon (1). The connecting hook-ends grip under the lower edge (40) of the housing (2) (direction E, FIG. 7A) and in the notches (50a–50d) which are open to achieve the narrow shape and limited width (D). The bow part (25b) has a connecting hook (53) at the top which is also hooked into the housing (2). As can be seen in FIG. 1, the connecting hooks (51) are positioned above the sloping parts of the bow parts (34a, 34b). They are as far apart as possible to make the conductors' (33) passage (85) as long and flat as possible, yet interrupted by the vertical reinforcement ribs (84a, b). The passage's width (85) is indicated as "B" in FIG. 7C. The width is sufficient to accommodate seven 6 mm$^2$ electric wires.

Also refer to FIGS. 8A–8D which show a diagram of the consecutive assembly steps. The power cable's (27) electric wires (33a–d) are guided to the wagon (1) and fixed to the clamps (31a–d) using the shoes (32a–d). To simplify matters, only half the number of the electric wires is shown (i.e. the wires connected to this side). Subsequently, the bow part (25b) is hooked onto the housing (2) as shown in FIG. 8B. The power cable (27) is then partly included in the pick-up chamber (85). As shown in FIG. 8C, the other bow part (25a) is positioned by the housing (8C) and to the bow part (25b) while enclosing the power cable (27). The axis (55) and star lock washer (56) are used to clamp both bow parts (25a, 25b) together. Additional wheels (54a, 54b) can also be used if expansion joins are used in the profile (60). The bayonet nut (26) is moved up along the power cable and fixed to the bow's underside (25). Then the tension relief collars (48a, 48b) are clamped onto the cable (27).

To disconnect the power cable (27) or to connect an electric wire to a different cable connector, follow the steps in reverse order.

What is claimed is:

1. An arrangement for providing power to a mobile machine, said arrangement comprising:
   an elongated, generally closed rail having a slot extending the length thereof and a plurality of power conducting strips disposed within and extending the length of said rail;
   a wagon disposed within the rail and having front and back portions, wherein said front and back portions are aligned along the length of the rail;
   a plurality of sliding contact brushes attached to said wagon and engaging the power conducting strips within the rail;
   an electrical connector and cable leads attached to said wagon for coupling said sliding contact brushes to the mobile machine for providing power to the mobile machine;
   first and second wheel assemblies; and
   first and second coupling means for detachably connecting said first and second wheel assemblies to the front and back portions of said wagon, respectively, wherein each of said first and second coupling means includes, in combination, a dovetail slot in said wagon and an extension on said wheel assemblies having dovetail-shaped ridges, and wherein said ridges are adapted for insertion in said slot in a tight-fitting manner.

2. The arrangement of claim 1 further comprising a snap-acting coupling pin inserted into said slot and said extension for connecting a wheel assembly to said wagon in a detachable manner.

3. The arrangement of claim 2 wherein said connecting pin includes opposed end portions each having dovetail-shaped ridges adapted for insertion into the dovetail slot of a wagon.

4. The arrangement of claim 3 wherein said connecting pin includes a spring loaded connecting member for attaching said connecting pin to a wagon in a snap-acting detachable manner.

5. The arrangement of claim 1 wherein said first and second wheel assemblies each include a pair of spaced, vertically oriented wheels each engaging an inner lower portion of the rail.

6. The arrangement of claim 5 wherein at least one of said first and second wheel assemblies further includes a third horizontally oriented wheel for engaging an inner lateral portion of the rail.

7. For use with an elongated, generally closed rail having a slot extending the length thereof and a plurality of power conducting strips disposed within and extending the length of said rail, a current collector arrangement for providing power to a mobile machine, said current collector arrangement comprising:
   first and second wagons disposed within the rail and having respective front and back portions, wherein said front and back portions are aligned along the length of the rail;
   sliding contact brushes disposed on opposed lateral portions of said first and second wagons and engaging the power conducting strips in the rail;
   electrical leads disposed in said first and second wagons and connected to said sliding contact brushes in each wagon, said electrical leads further connected to the mobile machine for providing power to the mobile machine;
   wheels attached to said first and second wagons to facilitate displacement of said wagons within and along the length of the rail;
   dovetail slots in facing back and front portions of said first and second wagons; and
   coupling means inserted in a snap-acting manner in the dovetail slots in facing back and front portions of said first and second wagons for connecting said wagons in a detachable manner.

8. The current collector of claim 7 wherein said coupling means includes dovetail-shaped ridges, and wherein said ridges are adapted for insertion in said slots in a tight-fitting manner.

9. The current collector of claim 8 wherein said coupling means further includes a coupling pin having opposed end portions each having a dovetail-shaped ridge adapted for insertion into the dovetail slot of a wagon.

10. The current collector of claim 9 herein said coupling pin further includes a spring loaded connecting member for attaching said coupling pin to a wagon in a snap-acting detachable manner.

11. The current collector of claim 1 further comprising:
    a housing attached to said electrical connector and cable leads providing power to the mobile machine; and
    detachable coupling means for connecting said housing to said wagon in a removable manner, wherein said housing extends through the slot in the rail and said cable leads are connected to said sliding contact brushes for providing power to the mobile machine.

12. The current collector of claim 11 wherein said housing is comprised of first and second detachable sections disposed on opposed sides of said cable leads, and wherein the first and second sections are detachable from one another and from said wagon to permit said housing to be removed from said wagon without disconnecting said cable leads.

13. The current collector of claim 12 further comprising a connecting pin part coupling said first and second sections together in a detachable manner.

14. The current collector of claim 13 further comprising a tension relief collar disposed about said cable leads and engaging said housing for connecting said cable leads to said housing and the first and second detachable sections of said housing together.

15. The current collector of claim 14 comprising a bayonet nut attached to a lower portion of said housing and disposed about said cable leads and above said tension relief collar.

16. The current collector of claim 15 further comprising a plurality of connecting hooks attached to said first and second detachable sections of said housing for coupling said housing to said wagon.

17. The current collector of claim 16 wherein said housing is elongated in horizontal cross section along the length of the rail and includes an inner aperture, and wherein said cable leads are disposed in said inner aperture and are each attached to a respective sliding contact brush.

18. The current collector of claim 17 wherein said current collector includes at least seven conductors each having a cross-sectional area of 6 mm$^2$ disposed in the inner aperture in said housing.

19. The current collector of claim 18 wherein each of said first and second detachable sections includes said connecting hooks, said connecting hooks including forward and aft connecting hooks and wherein said inner aperture is disposed intermediate said forward and aft connecting hooks.

* * * * *